Jan. 24, 1961 E. R. LAMSON ET AL 2,969,264
LUBRICATED ANTI-FRICTION BEARINGS
Filed April 16, 1958 2 Sheets-Sheet 1

INVENTOR.
EDWARD R. LAMSON
MARTIN N. DEVINE
BY
Arthur L. Collins
ATTORNEYS

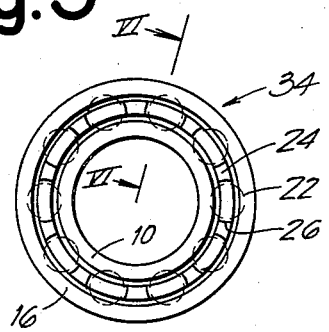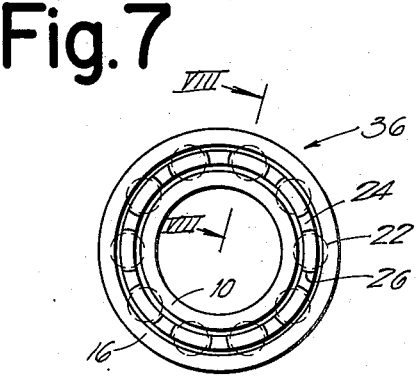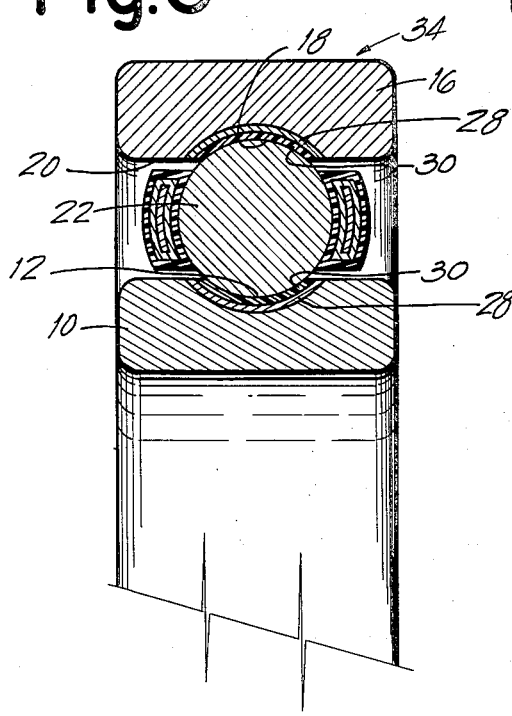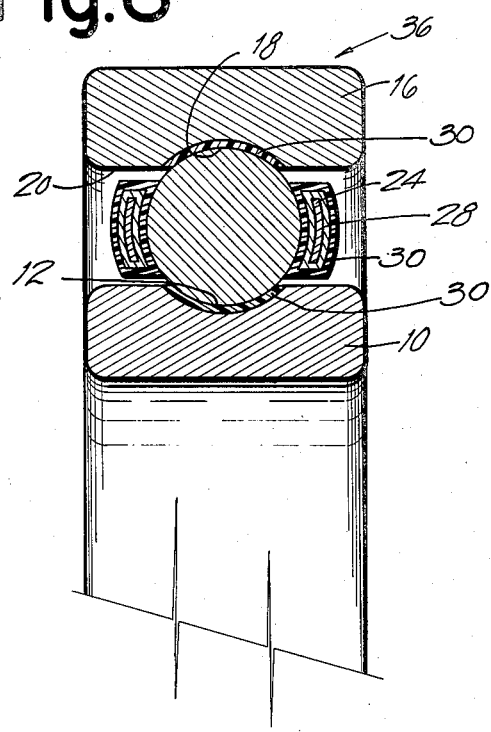

United States Patent Office 2,969,264
Patented Jan. 24, 1961

2,969,264
LUBRICATED ANTI-FRICTION BEARINGS

Edward R. Lamson, Greentree Road, Box 88, R.D. 4, Sewell, N.J., and Martin J. Devine, 2560 Prescott Road, Havertown, Pa.

Filed Apr. 16, 1958, Ser. No. 729,040

9 Claims. (Cl. 308—187)

(Granted under Title 35, U.S. Code (1952), sec. 266)

The invention described herein may be manufactured and used by or for the Government of the United States of America for governmental purposes without the payment of any royalties thereon or therefor.

The invention relates to lubricated anti-friction bearings and to a method of lubricating anti-friction bearings with bonded film lubricants. More particularly, the invention relates to high speed and high temperature anti-friction bearings such as ball bearings having a combination non-ferrous metal coating and a solid or dry-type lubricant film affixed or bonded to the components thereof and to a method of lubricating high speed and high temperature anti-friction bearings by coating the unassembled components of the bearing with non-ferrous metals and thereafter affixing or bonding dry-type lubricants thereto.

Prior attempts to lubricate high speed and high temperature anti-friction bearings with both wet-type lubricants such as greases and bonded film lubricants utilizing a dry-type lubricant or lubricants have been universally unsuccessful. It is well known that grease-type lubricants provide excellent lubrication for anti-friction bearings operated under conditions of relatively low speed and low temperature but have several inherent disadvantages when the bearings are operated under other conditions. For example, at high temperatures, greases become less viscous and have a tendency to seep or leak from a bearing, this loss due to seepage or leakage eventually and many times very quickly resulting in a failure of the greases to provide a film of lubricant between the friction or coacting surfaces of the bearing components. Conversely, at low temperatures, greases substantially increase in viscosity and materially add to the frictional drag or operating torque of a bearing. When greases are used at high temperatures coupled with a high vacuum, the greases vaporize and evaporate and thus deprive the bearing of the needed lubrication. It is also well known that greases deteriorate rapidly when exposed to certain types of chemical attack and nuclear radiation.

Bonded film lubricants, on the other hand, when used in combination with a non-ferrous metal coating and utilizing a dry-type lubricant such as a mixture of molybdenum disulphide and graphite as the lubricating constituent of the bonded film, possess none of the inherent disadvantages of the wet-type lubricants, but nevertheless, have never heretofore been successfully employed as a lubricating medium for high speed and high temperature anti-friction bearings such as ball bearings or the like. This failure to successfully lubricate bearings of this type with bonded film lubrication has resulted primarily from the failure to develope a method or technique whereby a coating of non-ferrous metal and bonded film lubricant having a substantially uniform predetermined thickness could be applied and affixed, respectively, to either all of the components of an anti-friction bearing, selected components of an anti-friction bearing, or selected surfaces of selected components of an anti-friction bearing. Coating the components of an anti-friction bearing with a non-ferrous metal provides a tenaciously adhering under-surface for the bonded film lubricant in addition to affording protection against the cracking or rupturing thereof. A bonded film of substantially uniform thickness is extremely important in the lubrication of high speed and high temperature anti-friction bearings due to the critical tolerances between the friction surfaces of the bearing components. A bonded film which is not substantially uniform in thickness will interfere with the proper relative movement between the components of the bearing and thus produce undesirable frictional forces and heat which will result in a cracking or failure of the bonded film. Bonding or affixing a lubricant to selected components only or to selected surfaces of selected components of an anti-friction bearing is also an important factor in the successful utilization of bonded film lubricants from the standpoint of the use or the environmental application of the bearing. In many environment applications, it has been found desirable and advantageous not to affix a lubricant to all of the components or to all of the surfaces of the components of an anti-friction bearing.

Accordingly, one of the objects of the present invention is to lubricate an anti-friction bearing with a bonded film lubricant having a predetermined thickness.

Another object of the invention is to provide an anti-friction bearing with a non-ferrous metal coating in a combination with a bonded film lubricant of substantially uniform thickness on the components of the bearing.

Another object of the invention is to provide an anti-friction bearing with a non-ferrous metal coating in combination with a bonded film lubricant of substantially uniform thickness on selected components or on selected surfaces of selected components of the bearing.

Another object of the invention is to provide a lubricated anti-friction bearing having a substantially uniform operating torque over the entire operating temperature range of the lubricant.

Another object of the invention is to provide a method of lubricating an anti-friction bearing with a bonded film lubricant having a substantially uniform and predetermined thickness.

Another object of the invention is to provide a method of lubricating an anti-friction bearing wherein a non-ferrous metal and a bonded film lubricant are applied to the unassembled components of the bearing.

Another object of the invention is to provide a method of lubricating an anti-friction bearing wherein selected components only of the bearing are coated with a non-ferrous metal and lubricated with a bonded film lubricant having a substantially uniform thickness.

In conformity with these objects, the preferred embodiment of the invention is characterized by a high speed and high temperature, steel, ball bearing having a non-ferrous metal coating on all of the components and comminuted dry-type lubricant bonded or affixed to all of the components thereof by a bonding agent comprised of a hardened or cured thermoset resin. The comminuted lubricant is uniformly dispersed in the bonding agent and the bearing components are completely surrounded or enveloped by a lubricating film having a substantially uniform thickness. The preferred method envisioned by the invention for lubricating an anti-friction bearing such as a high speed and high temperature ball bearing includes the steps of applying a coating of non-ferrous metal to all of the components of the bearing in an unassembled state, coating all of the metal-covered components of the bearing with a dry-type or solid comminuted lubricant suspended in a thermosetting bonding agent, heating the coated components to harden the bonding agent, and then reassembling the lubricated components into an operative unit to provide an anti-friction bearing having a bonded film lubricant on the friction surfaces thereof. The lubricant coating must, of necessity, be applied in a manner to provide a lubricating film of substantially uniform thickness, and the selection of the exact constituents for the coating mixture will be determined mainly by the conditions under which the bearing is expected to operate or perform.

These and other objects of the present invention will become readily apparent from the following description taken in connection with the accompanying drawings, wherein:

Fig. 5 is a side elevation of a ball bearing illustrating another embodiment of the invention;

Fig. 6 is an enlarged section taken along line VI—VI of Fig. 5;

Fig. 7 is a side elevation of a ball bearing illustrating another embodiment of the invention; and Fig. 8 is an enlarged section taken along the line VIII—VIII of Fig. 7.

Figure 1:
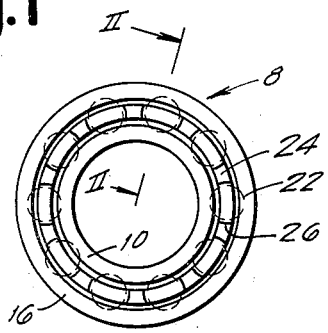
Fig. 1 is a side elevation of a ball bearing illustrating a preferred embodiment of the invention.
Figure 2:
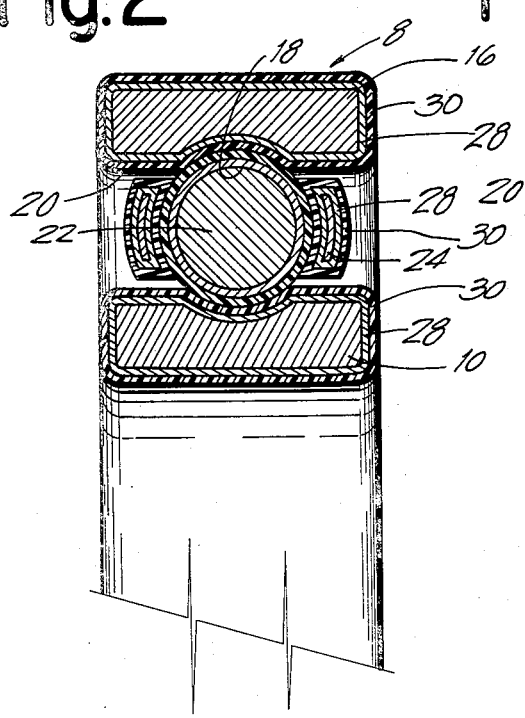
Fig. 2 is an enlarged section taken along the line II—II of Fig. 1.

Referring more particularly to the drawings wherein like structural details and components are designated by like reference numerals, Figs. 1 and 2 show an anti-friction bearing 8 of the ball-type having components including an inner ring or race means 10 provided with a circumferentially extending groove or raceway 12 in the outer periphery 14 thereof, and an outer ring or race means 16 provided with a circumferentially extending groove or raceway 18 in the inner periphery 20 thereof. A plurality of substantially spherical rolling elements or balls 22, in this instance ten in number, are carried in the raceways 12 and 18 and, due to a predetermined curvature of the raceways 12 and 18, are confined therein for rotary movement in a substantially circular orbit between the inner and outer race means 10 and 16, respectively. Being substantially spherical, balls 22 are also capable of independent rotary movement about their own geometrical axes and thus are capable of rotation both relative to themselves and to the inner and outer race means 10 and 16. A predetermined clearance or tolerance (not shown in the drawings) between the balls 22 and the raceways 12 and 18 permits the balls 22 to roll freely over the surfaces of the raceways.

A retainer or cage means 24 is carried by the balls 22 and serves to space the balls 22 a uniform or equal distance apart in order to equalize any load that may be applied to the balls 22 through the race means 10 and 16. The cage means 24 is provided with a plurality, in this instance ten, of pockets or the like 26 therein (Fig. 1) each of which (Fig. 2) is adapted to receive a ball 22. The inner periphery of each pocket 26 is provided with a predetermined curvature and is adapted to be carried on and thus frictionally engage the peripheral surface of its received ball 22.

The components of the anti-friction bearing 8 in this preferred embodiment of the invention are made of steel the balls and race means being made of 52100 steel and the cage means being made of 1010 steel, but may be made of any other material suitable for bearing use such as iron, stainless steel, etc. Various alloys of steel and stainless steel have been found to be particularly satisfactory materials for use in the construction of high speed and high temperature anti-friction bearings. Inasmuch as the structure and function of ball-type anti-friction bearings as well as the materials utilized in the construction thereof are well known in the art and per se form no part of the present invention, further discussion thereof is deemed unnecessary. Suffice it to say that in the use or environment application of the bearing 8, the inner race means 10 is adapted to receive a shaft or the like (not shown) which when rotated will also rotate the inner race means 10 and thereby impart rotation to the balls 22.

As best seen in Fig. 2, all of the components 10, 16, 22 and 24 of the bearing 8 are covered or coated with a thin layer or film of non-ferrous metal 28 which in turn carries a lubricant film or coating 30 which is tightly affixed or bonded thereto and completely surrounds or envelops each of the bearing components. The lubricant film 30 constituent-wise is comprised of a solid comminuted lubricant uniformly dispersed in a cured thermosetting bonding agent and the layer of non-ferrous metal 28 due to its porosity provides a tenaciously adhering or receptive undersurface for the bonding agent.

The non-ferrous metal film 28 in this preferred embodiment of the invention is comprised of silver and has a thickness of approximately 0.0001". This preferred thickness of the non-ferrous metal film 28 has been found to provide an extremely satisfactory undersurface for the lubricant film 30 although it should be pointed-out that the thickness per se is not critical and thus may be selectively varied. The selection of a particular thickness for film 28 is a matter of choice and will depend for the most part on the dimensional limitations or tolerances of a particular bearing. For instance, if the working or operating tolerances between the components of a given bearing are relatively small, the thickness of film 28 should be 0.0001" or less in order to keep the combined thicknesses of films 28 and 30 within a desired limit or within a range which will not interfere with the movement of the bearing components. If the tolerances between the components of a given bearing are relatively large, a film 28 having a thickness of more than 0.0001" may be satisfactorily utilized. The non-ferrous metal coating or film 28 may be applied to the components of bearing 8 by any suitable means or process capable of applying a film having a uniform and predetermined thickness, which suitable means or processes will be discussed more fully hereinafter in connection with the Method of Lubricating an Anti-Friction Bearing.

While it is preferred to utilize silver as the metal of film 28 in bearing 8, this invention also contemplates the use of any other suitable non-ferrous metal such as nickel and chromium. Silver has been found to yield evtremely satisfactory results, however, when applied to steel bearing in view of its softness and malleability. These two properties of silver permit the non-ferrous metal film 28 and the bonded lubricant film 30 on the cage means 24 and the raceways 12 and 18 of bearing 8 to yield or conform to the configuration of balls 24 when a load is applied to the bearing. The softness and malleability of the silver film 28 will enable the bonded film lubricant 30 to undergo localized bending and deformation without accompanying excessive localized stress concentrations and thus will have a substantial effect in preventing the rupture and cracking of the bonded film lubricant, especially when the sphericity of the balls 22 is not maintained within close limits. Non-ferrous metal films or coatings comprised of metals other than silver, metals such as nickel and chromium, are comparatively or much harder than silver and lack the malleability thereof, but, nevertheless, have been found to add resiliency to bonded film lubricants and thus to function as a cushioning means therefor.

In this preferred embodiment of the invention, the bonded film 30 constituent-wise is comprised of a mixture of finely pulverized molybdenum disulphide and graphite dispersed in a cured phenolic resin, the pulverized lubricant being mixed in a substantially 9:1 ratio by weight with 9 parts of molybdenum disulphide to 1 part of graphite. While the constituents utilized in this preferred embodiment have been found to provide a satisfactory lubricating film, it will be appreciated of course that these constituents are merely illustrative of the invention and are not to be construed in a limiting sense. The selection of the particular constituents comprising the bonded film is strictly a matter of choice and may include any other suitable dry-type comminuted lubricant such as boron nitride, tungsten disulphide or the like in combination with other suitable thermosetting bonding agents such as formaldehyde resins, silicone resins and vinyl resins. Suffice it to say, however, that the thermosetting agent selected should be capable of forming a tight bond that does not crack or "flake-off" in use and should be resistant to the deleterious effects of heat and pressure and to the action of hydrocarbons such as greases, oils and the like.

The mixture of comminuted molybdenum disulphide and graphite utilized as the lubricant in the preferred embodiment of the invention is a 5 micron grade although the size of the graphite particles is not critical. It has been found, however, that a solid comminuted lubricant having a particle size not greater than 7 microns provides a better lubricating action than a lubricant of larger particle size. The smaller size lubricant particles have a tendency to become more evenly dispersed in the thermosetting bonding agent and thus provide a more effective distribution of the lubricant.

It will also be appreciated that the lubricant of the bonded film may be comprised of single comminuted lubricant such as molybdenum disulphide only instead of a mixture of two lubricants or furthermore may be comprised of a mixture of more than two lubricants. If it is desired to use more than one comminuted lubricant in the bonded film, the lubricants selected can be mixed in equal or dissimilar proportions and the particle size of the lubricants may also be varied. The selection of a single comminuted lubricant or a predetermined blend of two or more will, of course, be a matter of choice which will for the most part depend on the environmental application of the lubricated bearing. For example, if it is desired to operate an anti-friction bearing at an extremely high temperature, it has been found that a comminuted lubricant comprised wholly or principally of molybdenum disulphide or boron nitride will provide a much more satisfactory lubricant than graphite.

The film thickness of a bonded film lubricant is especially important from the standpoint of satisfactory bearing operation, and in the preferred embodiment of the invention, film 30 on all of the components of bearing 8 has a thickness of approximately 0.0003". A film thickness of approximately 0.0003" is preferable in most instances although it should be pointed-out that the film thickness per se is not critical. It has been found, however, through extensive use and experimentation, that a bonded film thickness of at least 0.0002" and not more than 0.0005" will provide the most satisfactory lubrication for anti-friction bearings. Past performance tests on anti-friction bearings, especially high speed and high temperature anti-friction bearings, have shown that bonded lubricant films having a thickness of less than 0.0002" or greater than 0.0005" will readily fail in use after a short time of bearing operation and will thus fail to provide the necessary lubrication. The selection of a bonded film of the proper or desired thickness will again be a matter of choice which will depend on the particular bearing being lubricated and the conditions under which it is desired to operate the bearing. The tolerances between the bearing components, the bearing speed and temperature, the temperature of the ambient atmosphere or cooling medium and the loading of the bearing are all factors which must be considered in making a selection of the proper thickness for the bonded film lubricant.

Although it is preferable that the bonded film on all of the bearing components should be substantially identical in thickness and should be maintained within the 0.0002"–0.0005" range, it will be apparent to those skilled in the art that the thickness of the bonded film may also be varied within the preferable range of 0.0002"–0.0005" from one bearing component to another without affecting the optimum lubricating action or performance of the bonded film. For example, the bonded film on the balls of the bearing may have a thickness of 0.0002", on the race means may have a thickness of 0.0003" and on the cage means may have a thickness of 0.0005". On the other hand, it has also been found that the thickness of the bonded film on the cage means of a bearing may exceed and even greatly exceed the preferred maximum thickness of 0.0005" without seriously impairing the lubricating action of the bonded film. Bonded film thicknesses of up to 0.0012" have been found in some instances to provide satisfactory lubrication on a bearing cage means. This increase in film thickness of the film on the other components of the bearing is permissible in view of the fact the tolerances between the cage means and the balls is not as close as the tolerances between the other components of the bearing.

It will also be noted in Fig. 2 that the bonded film lubricant 30 is substantially uniform in overall thickness on the surface or surfaces of each of the bearing components. This substantial uniformity in thickness is especially important from the stand-point of preventing rupture or failure of the bonded film, particularly when the bearing is operated at high speeds and high temperatures. Due to the critical tolerances between the surfaces of the components of an anti-friction bearing, a bonded film which is not substantially uniform in thickness will readily produce undesirable frictional forces and heat which will quickly result in a failure of the bonded film.

Anti-friction bearings lubricated in accordance with the preferred embodiment of this invention and operated at shaft speeds of 10,000 r.p.m. and faster with light radial and thrust loads applied to the bearings have been found to perform satisfactorily for many hours without a failure or breakdown of the bonded film lubricant. On the other hand, it has also been found that when the balls or rolling elements of an anti-friction bearing in addition to the other components thereof are lubricated with a bonded film, the bearing will operate for much longer periods of time without failure of the bonded film if the shaft speed is kept below 10,000 r.p.m. and if the loading on the bearing is maintained at a relatively low value.

Figure 3:
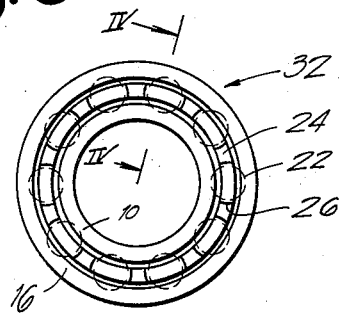
Fig. 3 is a side elevation of a ball bearing illustrating another embodiment of the invention.
Figure 4:
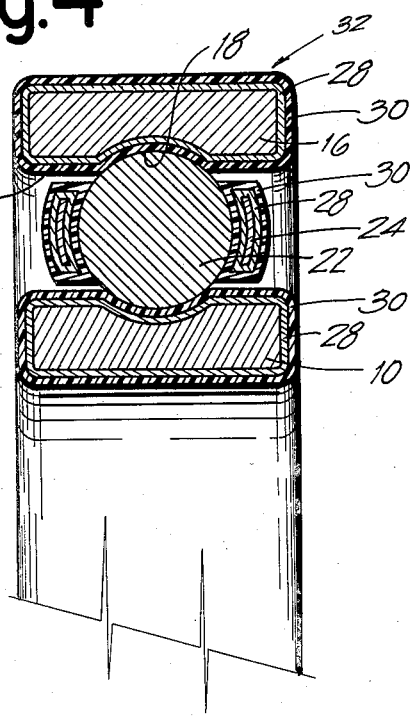
Fig. 4 is an enlarged section taken along the line IV—IV of Fig. 3.

Figs. 3 and 4 show another embodiment of the invention wherein all of the components of an anti-friction bearing 32 except the balls 22 thereof are coated with a non-ferrous metal film 28 and a bonded film lubricant 30. Bearing 32 is otherwise identical in all structural details to bearing 8 shown in Figs. 1 and 2, and the thickness of the non-ferrous metal film 28 and the thickness of the bonded film lubricant 30 within the limits hereinbefore discussed in connection with the preferred embodiment of the invention as well as the constituent mixture of the bonded film 30 are strictly a matter of choice which is again dependent on the environmental application of bearing 32 and the conditions under which it is expected to operate. Performance tests have indicated that an anti-friction bearing lubricated in accordance with this embodiment of the invention will operate satisfactorily for many hours at shaft speeds of 10,000 r.p.m. with relatively heavy radial and axial loads applied to the bearing without failure of the bonded film 30. In general, it has been found that an anti-friction bearing lubricated as shown in Figs. 3 and 4 will operate satisfactorily for much longer periods of time and at higher speeds and under much heavier loading than an anti-friction bearing lubricated in accordance with the preferred embodiment of the invention.

Figs. 5 and 6 show another embodiment of the invention wherein an anti-friction bearing 34 is provided with a layer of non-ferrous metal 28 and a bonded film lubricant 30 on only the cage means 24 and the raceways 12 and 18 thereof. Bearing 34 is otherwise identical in all structural details to bearing 32 of Figs. 3 and 4. Bearing 34 has generally been found to have performance characteristics substantially identical to the performance characteristics of bearing 32; however, its chief advantage over bearing 32 has been found to reside in certain environmental applications of the bearing wherein the widths of the bearing race means 10 and 16 and the outside diameter of the outer race means 16 are critical. By eliminating the bonded film lubricant on the two race means other than coating the surface of the raceways 12 and 18 thereof, the maximum outside dimensions of the two race means can be somewhat reduced.

Figs. 7 and 8 show another embodiment of the invention wherein an anti-friction bearing 36 is provided with a bonded film lubricant 30 only on the raceways 12 and 18 thereof and is provided with both a non-ferrous metal film 28 and a bonded film lubricant 30 on the cage means 24 thereof. Bearing 36 is otherwise identical in all structural details to bearing 34. Bearing 36 has the same dimensional advantages as bearing 34 by virtue of the fact that the raceways 12 and 18 only thereof are covered with the bonded film lubricant 30 and has been found to have performance characteristics substantially identical to bearing 34. The only operational difference between the two bearings 34 and 36 has been found to reside in the duration or time-length of satisfactory operation. Performance tests have shown that under the same axial and thrust loading bearings lubricated in accordance with the construction of bearing 34 will operate satisfactorily for a slightly longer period of time than bearings lubricated in accordance with the construction of bearing 36, this increased duration of operating time without loss of lubricity apparently resulting from the presence of the non-ferrous metal film 28 on the raceways of the bearing.

Anti-friction bearings lubricated in accordance with the present invention have been found to perform satisfactorily and to possess a relatively low and a substantially uniform operating torque or frictional drag over a wide range of operating temperatures. Tests have shown that an anti-friction bearing lubricated in accordance with the preferred embodiment of the invention will perform at a substantially constant operating torque at temperarues ranging from −94° F. to 350° F. These tests also showed that there was very little difference between the starting and running torque of the bearing so lubricated. Tests conducted on anti-friction bearings lubricated as shown in Figs. 3 and 4, Figs. 5 and 6 and Figs. 7 and 8 also revealed the existence of a relatively low starting torque, a substantially constant operating torque over a wide temperature range and a small differential between the starting and running torques of the bearings so lubricated, the temperatures varying between −94° F. to 350° F.

*Method*

The preferred method of lubricating anti-friction bearings and more particularly high speed and high temperature ball-type bearings, the balls and race means of which are made of 52100 steel and the cage means of which is made of 1010 steel, is comprised of the following steps, the method being operable to produce a lubricated bearing substantially identical to the lubricated anti-friction bearing shown in Figs. 1 and 2. The unassembled components of a steel ball bearing, the inner and outer race means, the balls or rolling elements and the cage means, are first cleaned to effect the removal of any contaminating foreign matter from the external surfaces thereof, particularly the removal of oils and greases. The components are cleaned in this preferred embodiment of the invention by vapor degreasing with a trichloroethylene vapor, although it will be apparent that the components could be cleaned with any other suitable type of cleaning agent or could be cleaned in any other suitable manner.

On the other hand, the cleaning step may be completely eliminated if the components are free of contaminating foreign matter, the cleaning step therefore merely being an optional step to be used when necessary.

Following the cleaning operation, a non-ferrous metal is applied to the unassembled components of the bearing to provide a metallic coating thereon having a substantially uniform and predetermined thickness. In this preferred embodiment of the invention, a coating or film of silver having a substantially uniform thickness of approximately 0.0001″ is applied to the bearing components by electroplating. Other means or processes such as hot dipping, flash-coating or the like could obviously be utilized to apply a coating of non-ferrous metal to the bearing components, but electroplating is preferred because of the results afforded thereby in regard to the thickness, porosity and uniformity of the non-ferrous metal film. By carefully controlling the electroplating both and the current density, the thickness, porosity and uniformity of the electro-deposited film can be very accurately predetermined and controlled with relative ease. It will also be appreciated that metals other than silver may be applied to the bearing components by electroplating or by any other suitable means or process. Nickel, chromium or any other metal suitable for coating purposes could be utilized in lieu of silver. The application of an electro-deposited film or coating of silver to the bearing components in the preferred embodiment of the invention is illustrative only and obviously is not to be interpreted as a limitation to a particular process or non-ferrous metal.

After the application of the non-ferrous metal film, the unassembled components of the bearing are coated with a lubricating composition or film comprised of a solid comminuted lubricant suspended in a thermosetting bonding agent which in this preferred embodiment is comprised of a mixture of finely pulverized or comminuted molybdenum disulphide and graphite suspended in a phenolic resin. The mixture of pulverized lubricants and phenolic resin is thinned by the addition of an organic solvent mixture thereto, which in this preferred embodiment is comprised of a mixture of 50% methylethylketone, 25% xylene and 25% butanol, and the thinned mixture is then applied to the bearing components by spraying. The mixture may be thinned to any desired consistency suitable for spraying, and it will be appreciated that any suitable thinner other than the mixture used in connection with the preferred embodiment may be utilized, thinners such as xylene, xylene-toluene, toluene, etc.

The proportionate mixture of the constituents of the coating composition utilized in the preferred embodiment of the invention includes the following constituents in percentages by weight: molybdenum disulphide 18, graphite 2, phenolic resin 12, thinner 68. The proportionate mixture of constituents is not critical, however, and will be determined mainly by such factors as the environmental application of the bearing and the tolerances between the components thereof. Furthermore, it will be readily understood by those skilled in the art that the percentages of the constituents utilized in the preferred embodiment of the method is merely illustrative of the invention and is not to be interpreted in a limiting sense. Mixing of the constituents may be affected by any suitable means such as milling or agitating. The size of the graphite particles, likewise, is not critical although it has been found that solid lubricants having a particle size not greater than 7 microns provide the best lubrication. Accordingly, the comminuted graphite utilized in the preferred embodiment is of a 3 micron particle size.

A thermosetting bonding agent other than a phenolic resin may also be used. Organic bonding agents such as silicone resins, vinyl resins, and epoxy resins have been found to be satisfactory. As discussed hereinbefore, however, the bonding agent selected must be capable of holding a solid comminuted lubricant in suspension and must also be resistant to heat and pressure in addition to the attacks of various hydrocarbons.

Instead of a mixture of molybdenum disulphide and graphite, the lubricant in the coating composition may be comprised of only a single comminuted lubricant or a mixture of more than two comminuted lubricants. Other suitable lubricants in comminuted form such as boron nitride and tungsten disulphide may be utilized. The selection of a particular lubricant or lubricants, as discussed hereinbefore in connection with the preferred embodiment of the lubricated bearing (Figs. 1 and 2), is again a matter of choice depending mainly on the environmental application of the bearing.

As also mentioned hereinbefore in connection with the preferred embodiment of the lubricated bearing, the coating composition on the bearing components must be substantially uniform in thickness and the thickness preferably should not be less than 0.0002" or greater than 0.0005", although the thickness per se is not critical. Therefore, in spraying the components of the bearing, care must be exercised to insure the application of a substantially uniform film to the components, the film having in this preferred embodiment a thickness of approximately 0.0003". It is also noteworthy to mention that it is preferable to rotate the bearing components while the lubricant coating is being sprayed thereon. The rotation of the components will facilitate the application of the coating to the components and will more or less insure that the coating will be substantially uniform in thickness on all of the surfaces of the components.

Although spraying is the preferred method by which the coating or lubricant film is applied to the bearing components, this invention also contemplates the use of any other suitable method of coating the components such as by dipping or brushing. Any suitable method may be utilized, but the method selected should insure the application of a substantially uniform film having a predetermined thickness.

After coating, the unassembled bearing components are air dried or dried at room temperature for a predetermined period. In the preferred embodiment of the invention, the coated components are air dried for one hour at an ambient temperature of 70° F. It will be understood of course that this preferred time and temperature are not critical and may be varied to a considerable extent far above or far below these preferred values. The purpose of the air drying step is to insure the formation of a smooth external surface on the coating or film covering the bearing components through the slow evaporation of the solvent in the coating. On the other hand, when the coating includes a solvent having a high vapor pressure, the air drying step in the method may be omitted inasmuch as most of the solvent will have already evaporated upon completion of the spraying operation.

After air drying, the unassembled components of the bearing are heated to harden the thermosetting bonding agent and thereby tightly bond or affix the comminuted lubricant to the non-ferrous metal film on the bearing components, the porosity of the non-ferrous metal film providing a means or mechanical interlock to firmly anchor the bonded film lubricant. The coated components in the preferred embodiment are heated by baking, the components being baked for a period of one hour at a temperature of 300° F. The temperature selected for heating obviously should not exceed the decomposition temperature of the coating but otherwise is not critical. Any heating temperature which produces a quick thermosetting of the bonding agent and a consequent rigid bonding of the comminuted lubricant to the metal coated surfaces of the bearing components will be satisfactory.

After being heated, the unassembled components of the bearing are assembled into an operative unit to provide an anti-friction bearing substantially identical to the bearing shown in Figs. 1 and 2, an anti-friction bearing having a bonded lubricant on all of the surfaces of the components thereof and, more particularly, on the friction surfaces of the components.

Another embodiment of this invention contemplates a method wherein all of the components of an anti-friction bearing except the rolling elements or balls thereof are covered with a non-ferrous metal film and are coated with a bonded lubricant. In other words, this method is identical with the preferred method of lubricating an anti-friction bearing with the exception that the balls are not included in the cleaning, non-ferrous metal applying, lubricant coating, air drying and heating steps of the process. An anti-friction bearing lubricated in accordance with this embodiment of the invention would be substantially identical in structure to the anti-friction bearing shown in Figs. 3 and 4.

Another embodiment of the present invention envisions the idea of lubricating an anti-friction bearing by applying a non-ferrous metal film and a bonded film lubricant to the cage means and the raceways only of the bearing. In this embodiment of the invention, the inner and outer races of the bearing are masked after being cleaned to cover all of the external surfaces thereof other than the raceways therein. After the masking step, the cage means and the raceways only are covered with the non-ferrous metal film and coated with the lubricating composition. Aside from the masking step, this embodiment of the method is otherwise identical to the last embodiment and would result in the production of a lubricated bearing substantially identical in structure to the bearing shown in Figs. 5 and 6.

Still another embodiment of the invention proposes a method of lubricating an anti-friction bearing wherein the raceways of the bearing are coated only with a bonded film lubricant and the cage means of the bearing is both covered with a non-ferrous metal film and coated with a bonded film lubricant. The inner and outer race means are also masked as in the last mentioned embodiment of the invention to cover all surfaces thereon other than the raceways. After the raceways and the cage means are coated with the lubricating composition, the inner and outer race means and the cage means are air dried and then heated to bond the lubricant to the coated components, following which all of the components of the bearing are reassembled into an operative unit. An anti-friction bearing lubricated in accordance with this embodiment of the invention would be substantially identical in structure to the anti-friction bearing shown in Figs. 7 and 8.

Although the present invention has ben specifically shown and herein described in connection with a ball-type anti-friction bearing made of steel, it will readily be appreciated that the invention could be applied with equal facility to the lubrication of a roller-type anti-friction bearing or any other type of anti-friction bearing made of iron, stainless steel or any other material suitable for use in the construction of anti-friction bearings.

Obviously many modifications and variations of the present invention are possible in the light of the above teachings. It is therefore to be understood that within the scope of the appended claims the invention may be practiced otherwise than as specifically described.

What is claimed is:

1. An anti-friction bearing comprising inner race means having a raceway therein, outer race means having a raceway therein, a plurality of rolling elements carried in said raceways and being movable relative thereto, cage means associated with said rolling elements and being operable to separate said rolling elements, a coating of non-ferrous metal carried by and completely enveloping said inner and outer race means, said rolling elements and said cage means, and a bonded film lubricant having a predetermined thickness carried by and completely enveloping said coating of non-ferrous metal on said inner and outer race means, said rolling elements and said cage means, said bonded film lubricant being comprised of a solid comminuted lubricant dispersed in a thermosetting resin and being substantially uniform in thickness.

2. An anti-friction bearing as claimed in claim 1 wherein said solid comminuted lubricant is comprised of a mixture of graphite and molybdenum disulphide.

3. An anti-friction bearing as claimed in claim 1 wherein said solid comminuted lubricant is comprised of graphite.

4. An anti-friction bearing as claimed in claim 1 wherein said solid comminuted lubricant is comprised of molybdenum disulphide.

5. An anti-friction bearing as claimed in claim 1 wherein the thickness of said bonded film lubricant is not less than 0.0002″ and not greater than 0.0005″.

6. An anti-friction bearing as claimed in claim 1 wherein said coating of non-ferrous metal is comprised of a metal selected from the group consisting of silver, nickel or chromium.

7. An anti-friction bearing comprising inner race means having a raceway therein, outer race means having a raceway therein, a plurality of rolling elements carried in said raceways and being movable relative thereto, cage means associated with said rolling elements and being operable to separate said rolling elements, a coating of non-ferrous metal carried by and completely enveloping said inner and outer race means and said cage means, and a bonded film lubricant carried by and enveloping said coating of non-ferrous metal on said inner and outer race means and said cage means, said bonded film lubricant being comprised of a solid comminuted lubricant suspended in a thermosetting resin and being substantially uniform in thickness, said bearing having a substantially uniform operating torque over the entire temperature operating range of said bonded film lubricant.

8. An anti-friction bearing comprising inner race means having a raceway therein, outer race means having a raceway therein, a plurality of rolling elements carried in said raceways and being movable relative thereto, cage means associated with said rolling elements and being operable to separate said rolling elements, a coating of non-ferrous metal carried by and completely covering said cage means and said raceways in said inner and outer race means, and a bonded film lubricant carried by and covering said raceways and said cage means, said bonded film lubricant being comprised of a solid comminuted lubricant dispersed in a thermosetting resin and being substantially uniform in thickness, said bearing having a substantially uniform operating torque over the entire temperature operating range of said bonded film lubricant.

9. An anti-friction bearing comprising inner race means having a raceway thereon, outer race means having a raceway therein, a plurality of rolling elements carried in said raceways and being movable relative thereto, cage means associated with said rolling elements and being operable to separate said rolling elements, a coating of non-ferrous metal carried by and completely enveloping said cage means, and a bonded film lubricant carried by and covering said raceways and said coating of non-ferrous metal on said cage means, said bonded film lubricant being comprised of a solid comminuted lubricant suspended in a thermoset resin and being substantially uniform in thickness, said bearing having a substantially uniform operating torque over the entire temperature operating range of said bonded film lubricant.

References Cited in the file of this patent

UNITED STATES PATENTS

| | | |
|---|---|---|
| 1,639,351 | Robson | Aug. 16, 1927 |
| 1,947,004 | Goddard et al. | Feb. 13, 1934 |
| 2,078,456 | Pew | Apr. 27, 1937 |
| 2,504,094 | Turner et al. | Apr. 11, 1950 |
| 2,516,567 | Hamm | July 25, 1950 |
| 2,685,543 | Sindeband | Aug. 3, 1954 |
| 2,697,645 | Mitchell | Dec. 21, 1954 |
| 2,704,234 | Love et al. | Mar. 15, 1955 |

FOREIGN PATENTS

| | | |
|---|---|---|
| 695,195 | Great Britain | May 22, 1950 |
| 657,080 | Great Britain | Sept. 12, 1951 |
| 731,348 | Great Britain | Sept. 8, 1955 |
| 757,582 | Great Britain | Sept. 19, 1956 |

OTHER REFERENCES

"Nylon Parts for Ball Bearings," published in Product Engineering, February 1952, pages 119 thru 123 relied upon.